United States Patent [19]

Hopkins, Jr.

[11] 4,036,792

[45] July 19, 1977

[54] POLYISOCYANURATE FOAMS PREPARED BY A COCATALYST SYSTEM

[75] Inventor: Henry S. Hopkins, Jr., Ashland, Ohio

[73] Assignee: General Latex and Chemical Corporation, Cambridge, Mass.

[21] Appl. No.: 596,367

[22] Filed: July 16, 1975

[51] Int. Cl.$^2$ .............................................. C08G 18/18
[52] U.S. Cl. .................... 260/2.5 AW; 260/2.5 AB; 260/2.5 AC; 260/77.5 AB; 260/77.5 AC; 260/77.5 NC; 252/426; 252/438
[58] Field of Search ................... 260/2.5 AB, 2.5 AC, 260/2.5 AW, 77.5 NC, 77.5 AB, 77.5 AC; 252/182, 426, 438

[56] References Cited

U.S. PATENT DOCUMENTS

| | | | |
|---|---|---|---|
| 3,644,168 | 2/1972 | Bonk et al. | 260/2.5 AW |
| 3,676,380 | 7/1972 | McLaughlin | 260/2.5 AW |
| 3,723,364 | 3/1973 | McLaughlin | 260/2.5 AW |

*Primary Examiner*—Eugene C. Rzucidlo
*Attorney, Agent, or Firm*—Richard P. Crowley

[57] ABSTRACT

Polyisocyanurate foamable compositions, polyisocyanurate foams and a process of preparing such foams wherein the foam consists essentially of recurring isocyanurate linkages, the foam exhibiting good friability properties and prepared by reacting a polyisocyanate in the presence of a cocatalyst system comprising a trimer catalytic amount of an alkylaminoalkyl phenol, and an amount of from about 1 to 15% by weight of the dialkylaminoalkyl phenol of a triethylene diamine or homolog thereof.

20 Claims, No Drawings

POLYISOCYANURATE FOAMS PREPARED BY A COCATALYST SYSTEM

BACKGROUND OF THE INVENTION

Polyisocyanates, such as aliphatic and aromatic isocyanates like diisocyanates, have been polymerized in the presence of a trimerization catalyst to provide rigid polyisocyanurate foams. The polyisocyanate trimerization reaction has been carried out in bulk and in solution to provide essentially cross-linked, very brittle and very friable foam products. The foam products are produced by combining polyisocyanate, an inert blowing agent, such as a low-boiling-point liquid like halocarbons, and one or more trimer catalysts like a tertiary amine, and heating to effect the polyisocyanurate reaction. The polyisocyanurate foams produced to date have not been commercially acceptable, and have been characterized by high brittleness and high friability. Brittleness refers to the internal friability of the foam structure which remains essentially unchanged with time; that is, it is structural and molecular in nature, while friability refers to the state of the surface of the polyisocyanurate foam; that is, the powderability of the surface when subject to pressure, which friability changes with time.

Attempts to reduce the friability of polyisocyanurates have been made by modification of the polyisocyanurate principally through the introduction of other chemical linkages. Epoxy-modified isocyanurates have not been commercially acceptable, since they are expensive, the reaction is difficult to control and the materials exhibit limited processing properties. Imide-modified isocyanurates are very thermally stable with high thermal conductivity, but also are prepared from expensive raw materials. Carbodiimide-modified isocyanurates also are expensive and the reaction is difficult to control. The present-day, best, commercial products are the urethane-modified isocyanurate products which, although expensive, can be prepared by known and readily available commercial catalytic agents, and provide foams of good thermal and flame-resistant properties.

In the preparation of such polyisocyanurate; i.e., trimer, foams consisting essentially of recurring cross-linked isocyanurate units and the modified polyisocyanurates, a wide variety of trimer catalysts and combinations have been suggested and used (see, for example U.S. Pat. Nos. 3,487,080; 3,723,364; 3,736,298; and 3,759,916). Such trimer catalysts have included tertiary amines, such as N,N'-dialkylaminoalkyl phenols and the like.

It is, therefore, most desirable to provide trimer isocyanurate foams which have low friability while retaining the other desirable properties of such foams, and methods of preparing such foams which provide for improved and rapid process conditions and cure of the polyisocyanurate foams.

SUMMARY OF THE INVENTION

My invention concerns polyisocyanurate products of reduced or low friability and an improved process of preparing such polyisocyanurate products employing a unique catalyst system. In particular, my invention relates to polyisocyanurate foams and modified polyisocyanurate foams of low friability, and a process of preparing such foams with improved cure promotion by the employment of a combination of a cocatalyst system comprising a dialkylaminoalkyl phenol with a $C_2-C_3$ alkylene diamine, particularly triethylene diamine and its lower alkyl; e.g., methyl, homolog. My unique catalyst system permits a substantial reduction in foam rise time and in the cure time of the trimer foam in comparison to other prior art catalysts and catalyst systems, as well as providing a foam product of unexpected properties as regards friability.

My foamable composition comprises a two-component, one-shot composition which, on mixing the component parts, provides for the room-temperature reaction of the components; e.g., 65° to 80° F, to provide a trimer foam product which is cured by its own heat exotherm of reaction, but where, if desired, heat may also be applied.

The one component may comprise a polyisocyanate compound, either aliphatic or aromatic, which term also includes isocyanate-terminated urethane prepolymers, as well as polyol and other modified polyisocyanurate prepolymers, the isocyanate subject to trimerization to a polyisocyanurate in the presence of a trimer catalyst. The second component of my composition comprises my catalyst system as herein described, and optionally an expanding amount of an inert blowing agent, such as a halocarbon, where a foam product is desired; a surfactant or cell-control agent, such as a silicone product, to aid in the preparation of the foam and cell size; plasticizers, such as nonvolatile liquid esters of hydrocarbon; phosphates, etc., and other additives or modifying agents as desired, such as flame and smoke-retardant additives, stabilizers, synergists, polyols, resins, alkanols, particular fillers, etc.

A wide variety of organic isocyanates may be employed which are subject to trimerization which includes, but is not limited to, methylene bis(phenyl-)isocyanate and its isomers and mixtures thereof, and other polymethylene polyphenyl polyisocyanates, $m$ or $p$ phenylene diisocyanate, hexamethylene diisocyanate, all as well known and used in the art. Aromatic isocyanates may be used, such as tolylene diisocyanate, diphenyl methane diisocyanate, and xylylene diisocyanate.

My cocatalyst system comprises the dialkylaminoalkyl phenols as the major trimer catalyst to be employed, and includes those lower alkyl group phenols; e.g., $C_1-C_6$, such as methyl, ethyl, isobutyl, and particularly the methyl groups, such as monodimethylaminomethyl phenol and (trisdimethylaminoethyl) phenol.

The dialkylaminoalkyl phenol is typically present in an amount to act as a trimer catalyst; for example, in an amount of from about 0.5 to 15% by weight, such as 1 to 10% by weight. The cocatalyst is a poly $C_2-C_3$ alkylenediamine, and particularly tripropylene and trisethylenediamine and the lower alkyl, particularly the methyl, homologs thereof. The cocatalyst is employed in combination with the primary catalyst in a smaller amount, and particularly in an amount of from about 1 to 15% of the dialkylaminoalkyl phenol is used as set forth more particularly in the examples.

My cocatalyst system may be used alone or in combination with other catalysts or synergist additives, such as with other tertiary amines and metal compounds, such as tin compounds. The combination of my catalyst system significantly and unexpectedly improves and reduces the foam rise time and cure time in the formation of polyisocyanurate from products over the use of either compound employed separately or in combination with other trimer catalysts.

Where a foam product is desired, such as for thermal insulation purposes, an inert liquid, volatile, blowing agent, such as a halocarbon like methylene chloride, or fluorocarbons like fluoro and chloro methyl and ethyl compounds known as Freon (a trademark of E.I. duPont deNemours Co.), may be used typically in amounts of from about 0.1 to 15% by weight. If desired, other blowing agents can be employed or a gas, such as air, mechanically incorporated into the reaction mixture prior to curing.

The process is carried out by simply mixing the one and two components, and the reaction occurs in the presence of the cocatalyst system.

My invention, including the foam products, and the process of preparing the foams with my cocatalysts in comparison to other catalysts, will be set forth for the purpose of illustration only in connection with the following examples; however, it is recognized and a part of my invention that various substitutions and modifications can be made in such formulations and and techniques without departing from the spirit and scope of my invention.

DESCRIPTION OF THE EMBODIMENTS

The prior use of N,N'-dialkylaminoalkyl phenols as catalysts to produce isocyanurate foams has been marred by two major drawbacks. The foams produced are very friable — firable to the extent that some form of linkage modification is required to make them useful. These foams usually require twenty-four hours or longer to reach maximum cure. Maximum cure is defined as the point of minimum friability or maximum toughness.

My invention has greatly reduced or eliminated the drawbacks of the dialkylaminoalkyl phenol catalyst systems by using small quantities of triethylene diamine in combination with dialkylaminoalkyl phenols. Foams produced by my technique exhibit greatly reduced friability; that is, roughly one-half to one-third the friability of foams produced without triethylene diamine. Furthermore, maximum cure occurs within twenty-four hours, frequently within six hours.

In general, the use of combination catalyst systems to promote cure and to improve properties is not novel for modified isocyanurate foam production. However, the use of small quantities of triethylene diamine with N,N'-dialkylaminoalkyl phenols as a combination catalyst, particularly in the preparation of unmodified trimer foams, provides new and totally unexpected process and product results.

Many commercialy available aminoalkylated phenols, tertiary amines and tin catalysts were evaluated as potential catalysts for isocyanurate from foam production. Monodimethylaminomethyl phenol and tridimethylaminomethyl phenol were both found to be fairly efficient and reactive trimer catalysts with sufficient reactivity for conventional foam applicability. Tertiary amines and tin catalysts alone were found to be either nonreactive or extremely slow reacting such that they are not applicable for foam technology. The following catalysts were evaluated: dibutyltin diacetate, dibutyltin dilaurate, tetramethyl propane diamine, tetramethyl butane diamine, tetramethyl ethane diamine, N-ethylmorpholine, N-methyl morpholine, triethylamine, triethanolamine, dimethylethanol amine, diethylethanol amine, N,N'-dimethylcyclohexyl amine, N-methyldicyclohexyl amine, bis (beta-N,N'-dimethylamino) ethyl ether, triethanolamine borate, and triethylenediamine. None of these amines were active trimerization catalysts.

Some typical formulations are set forth in Table I.

TABLE I

| | Wt. % | | | | | | |
|---|---|---|---|---|---|---|---|
| | 1 | 2 | 3 | 4 | 5 | 6 | 7 |
| Part A | | | | | | | |
| Mondur MR | 70 | 70 | 70 | 70 | 70 | 70 | 70 |
| Part B | | | | | | | |
| Freon 11-B | 18 | 18 | 18 | 18 | 18 | 18 | 18 |
| DC-193 | 1 | 1 | 1 | 1 | 1 | 1 | 1 |
| Dioctyl Phthalate | 6 | 6 | 6 | 6 | 6 | 6 | 6 |
| DMP-30 | 5 | — | 4 | — | — | — | — |
| DMP-10 | — | 5 | 1 | — | — | — | — |
| Dabco | — | — | — | 5 | — | — | — |
| TMBDA | — | — | — | — | 5 | — | — |
| T-12 | — | — | — | — | — | 5 | — |
| Triethylamine | — | — | — | — | — | — | 5 |
| Cream (sec) | 17 | 20 | 17 | — | — | — | — |
| Gel (sec) | 80 | 75 | 80 | — | — | — | — |
| Rise (sec) | 120 | 110 | 120 | — | — | — | — |

This data confirmed that N,N'-dialkylaminoalkyl phenols are indeed trimer catalysts, while triethylenediamine alone is not — at least in the sense that it is a practical catalyst.

The foams produced using aminoalkyl phenol catalysts alone were very friable and required at least 48 hours to attain a cured state. Friability and toughness were judged on an appearance basis, but dimensional stability tests give some quantitative indication of cure as the following data shows:

| | Wt. % |
|---|---|
| Part A | |
| Mondur MR | 70 |
| Part B | |
| Freon 11-B | 18 |
| DC-193 | 1 |
| D.O.P. | 6 |
| DMP-30 | 5 |
| Cream (sec) | 17 |
| Gel (sec) | 80 |
| Rise (sec) | 120 |
| Mix: 210g A/90g B | |

TABLE II

CUBES CUT FROM FREE RISE SAMPLE

| | 24 Hour Data in % Volume Change | | |
|---|---|---|---|
| Cure Time (Hours) | Cold Shrink (−20° F) | Dry Heat (300° F) | Humid Aging 158° F, 100% R.H.) |
| 6 | −40% | +20% | +30% |
| 24 | −20% | +10% | +20% |
| 48 | −5% | +5% | +10% |

These data typical of isocyanurate foams produced using aminoalkyl phenol catalysts alone.

Next, attempts were made to utilize various cocatalysts in combination with aminoalkyl phenols. All of the tin salts and tertiary amines mentioned above were utilized in the following formulations with the following results:

TABLE III

| | 1 | 2 | 3 | 4 | 5 | 6 | 7 |
|---|---|---|---|---|---|---|---|
| Part A | | | | | | | |
| Mondur MR | 70.0 | 70.0 | 70.0 | 70.0 | 70.0 | 70.0 | 70.0 |
| Part B | | | | | | | |
| Freon 11-B | 17.0 | 17.0 | 17.0 | 17.0 | 17.0 | 17.0 | 17.0 |
| DC-193 | 1.0 | 1.0 | 1.0 | 1.0 | 1.0 | 1.0 | 1.0 |
| D.O.P. | 7.0 | 6.9 | 6.75 | 6.5 | 6.0 | 5.5 | 5.0 |
| DMP-30 | 5.0 | 5.0 | 5.0 | 5.0 | 5.0 | 5.0 | 5.0 |
| T-12 | — | 0.1 | 0.25 | 0.5 | 1.0 | 1.5 | 2.0 |
| Cream (sec) | 17 | 22 | 27 | 34 | 44 | 49 | 65 |
| Gel (sec) | 80 | 75 | 70 | 70 | 68 | 70 | — |

TABLE III-continued

|  | 1 | 2 | 3 | 4 | 5 | 6 | 7 |
|---|---|---|---|---|---|---|---|
| Rise (sec) | 120 | 105 | 90 | 90 | 90 | 95 | — |
| Cr./Gel | .219 | .294 | .385 | .486 | .647 | 0.70 | — |
| Cr./Rise | .142 | .210 | .300 | .378 | .463 | .516 | — |
| Gel/Rise | .667 | .714 | .778 | .778 | .716 | .737 | — |

TABLE IV

|  | 1 | 2 | 3 | 4 | 5 | 6 | 7 |
|---|---|---|---|---|---|---|---|
| Part A |  |  |  |  |  |  |  |
| Mondur MR | 70.0 | 70.0 | 70.0 | 70.0 | 70.0 | 70.0 | 70.0 |
| Part B |  |  |  |  |  |  |  |
| Freon 11-B | 17.0 | 17.0 | 17.0 | 17.0 | 17.0 | 17.0 | 17.0 |
| DC-193 | 1.0 | 1.0 | 1.0 | 1.0 | 1.0 | 1.0 | 1.0 |
| D.O.P. | 7.0 | 6.75 | 6.5 | 6.0 | 5.5 | 5.0 | 4.0 |
| DMP-30 | 5.0 | 5.0 | 5.0 | 5.0 | 5.0 | 5.0 | 5.0 |
| TMBDA | 0.0 | 0.25 | 0.5 | 1.0 | 1.5 | 2.0 | 3.0 |
| Cream (sec) | 17 | 20 | 19 | 19 | 19 | 19 | 19 |
| Gel (sec) | 80 | 65 | 50 | 43 | 40 | 38 | 38 |
| Rise (sec) | 120 | 90 | 70 | 55 | 45 | 44 | 43 |
| Cr./Gel | .219 | .307 | .380 | .442 | .475 | .500 | .500 |
| Cr./Rise | .142 | .222 | .271 | .346 | .423 | .432 | .432 |
| Gel/Rise | .667 | .723 | .714 | .782 | .889 | .864 | .883 |

TABLE V

|  | 1 | 2 | 3 | 4 | 5 | 6 | 7 |
|---|---|---|---|---|---|---|---|
| Part A |  |  |  |  |  |  |  |
| Mondur MR | 70.0 | 70.0 | 70.0 | 70.0 | 70.0 | 70.0 | 70.0 |
| Part B |  |  |  |  |  |  |  |
| Freon 11-B | 17.0 | 17.0 | 17.0 | 17.0 | 17.0 | 17.0 | 17.0 |
| DC-193 | 1.0 | 1.0 | 1.0 | 1.0 | 1.0 | 1.0 | 1.0 |
| D.O.P. | 7.0 | 6.95 | 6.9 | 6.7 | 6.5 | 6.0 | 5.5 |
| DMP-30 | 5.0 | 5.0 | 5.0 | 5.0 | 5.0 | 5.0 | 5.0 |
| Dabco | 0.0 | 0.05 | 0.10 | 0.3 | 0.5 | 1.0 | 1.5 |
| Cream | 17 | 20 | 21 | 23 | 27 | 40 | 1800 |
| Gel | 80 | 50 | 40 | 30 | 35 | 52 | 1860 |
| Rise | 120 | 70 | 55 | 45 | 45 | 67 | 1920 |
| Cr./Gel | .219 | .400 | .525 | .766 | .771 | .770 | .968 |
| Cr./Rise | .142 | .286 | .383 | 0.51 | .600 | .600 | .938 |
| Gel/Rise | .667 | .714 | .727 | .667 | .777 | .777 | .968 |

TABLE VI

|  | 1 | 2 | 3 | 4 | 5 | 6 |
|---|---|---|---|---|---|---|
| Part A |  |  |  |  |  |  |
| Mondur MR | 70.0 | 70.0 | 70.0 | 70.0 | 70.0 | 70.0 |
| Part B |  |  |  |  |  |  |
| Freon 11-B | 17.0 | 17.0 | 17.0 | 17.0 | 17.0 | 17.0 |
| DC-193 | 1.0 | 1.0 | 1.0 | 1.0 | 1.0 | 1.0 |
| D.O.P. | 4.0 | 3.75 | 3.5 | 3.0 | 2.0 | 1.5 |
| DMP-30 | 8.0 | 8.0 | 8.0 | 8.0 | 8.0 | 8.0 |
| Dabco | 0.0 | 0.25 | 0.5 | 1.0 | 2.0 | 2.5 |
| Cream (sec) | 11 | 14 | 14 | 17 | 20 | 22 |
| Gel (sec) | 35 | 18 | 18 | 22 | 28 | 32 |
| Rise (sec) | 60 | 24 | 23 | 32 | 37 | 42 |
| Cr./Gel | .314 | .778 | .778 | .773 | .715 | .688 |
| Cr./Rise | .183 | .585 | .608 | .532 | .542 | .525 |
| Gel/Rise | .583 | .750 | .782 | .687 | .730 | .762 |

TABLE VII

|  | 1 | 2 | 3 | 4 |
|---|---|---|---|---|
| Part A |  |  |  |  |
| Mondur MR | 70 | 70 | 70 | 70 |
| Part B |  |  |  |  |
| Freon 11-B | 17 | 17 | 17 | 17 |
| DC-193 | 1.0 | 1.0 | 1.0 | 1.0 |
| D.O.P. | 7.0 | 6.75 | 6.5 | 6.0 |
| DMP-30 | 5.0 | 5.0 | 5.0 | 5.0 |
| DMEA | 0.0 | 0.25 | 0.5 | 1.0 |
| Cream (sec) | 17 | 16 | 15 | 10 |
| Gel (sec) | 80 | 84 | 80 | 80 |
| Rise (sec) | 120 | 110 | 114 | 100 |
| Cream/Gel | .219 | .190 | .188 | .125 |
| Cream/Rise | .142 | .145 | .132 | .100 |
| Gel/Rise | .667 | .764 | .702 | .800 |

TABLE VIII

|  | 1 | 2 | 3 | 4 |
|---|---|---|---|---|
| Part A |  |  |  |  |
| Mondur MR | 75 | 75 | 75 | 75 |
| Part B |  |  |  |  |
| Freon 11-B | 17 | 17 | 17 | 17 |
| DC-193 | 1.5 | 1.5 | 1.5 | 1.5 |
| DMP-30 | 4.0 | 4.0 | 4.0 | 4.0 |
| D.O.P. | 2.5 | 2.25 | 2.0 | 1.5 |
| Dabco | 0.0 | 0.25 | 0.50 | 1.0 |
| Cream (sec) | 25 | 32 | 36 | 37 |
| Gel (sec) | 80 | 41 | 47 | 49 |
| Rise (sec) | 130 | 54 | 65 | 69 |
| Cream/Gel | .313 | .780 | .766 | .755 |
| Cream/Rise | .192 | .593 | .554 | .536 |
| Gel/Rise | .192 | .759 | .723 | .710 |

TABLE IX

|  | 1 | 2 | 3 | 4 | 5 |
|---|---|---|---|---|---|
| Part A |  |  |  |  |  |
| Mondur MR | 75 | 75 | 75 | 75 | 75 |
| Part B |  |  |  |  |  |
| Freon 11-B | 17 | 17 | 17 | 17 | 17 |
| DC-193 | 1.5 | 1.5 | 1.5 | 1.5 | 1.5 |
| D.O.P. | 2.5 | 0.5 | 0.5 | 0.5 | 0.5 |
| DMP-30 | 4.0 | 4.0 | 4.0 | 4.0 | 4.0 |
| Niax A-1 | — | 2.0 | — | — | — |
| N,N' dimethylcyclo-hexylamine | — | — | 2.0 | — | — |
| N-methyldicyclo-hexylamine | — | — | — | 2.0 | — |
| Triethylamine | — | — | — | — | 2.0 |
| Cream (sec) | 25 | 25 | 23 | 25 | 20 |
| Gel (sec) | 80 | 75 | 70 | 65 | 65 |
| Rise (sec) | 130 | 130 | 135 | 135 | 130 |
| Cream/Gel | .313 | .333 | .329 | .385 | .308 |
| Cream/Rise | .192 | .192 | .170 | .185 | .154 |
| Gel/Rise | .615 | .577 | .519 | .481 | .500 |

From examination of the above data in Tables III through IX, one can see some rather unusual trends and completely unexpected results. For the most part, simple tertiary amines, such as triethylamine, N,N'-dimethylcyclohexylamine, or N-ethylmorpholine, do not effect the reactivity of the foam system to a significant degree when used at levels of up to 50% of the level of aminoalkyl phenol employed. Furthermore, the cure of these foams was not improved over those using aminoalkyl phenol alone.

Those amines, such as dimethylethanolamine or diethylethanolamine, promoted a faster cream time in the foam system (due probably to the reactive hydrogen), but gelation and rise were unaffected. These foams were at least friable, if not more friable, than the straight aminoalkyl phenol foams, and the cure was not improved.

The tin catalysts displayed an unusual effect on the reactivity of the foams. As the level of tin is increased from 2 to 30% of the level of aminoalkyl phenol, the cream time appears to become longer, while the gel and rise times appear to become shorter. What is actually occurring is that the cream-to-gel, cream-to-rise, and gel-to-rise ratios are maximizing. The same type of effect occurs with the diamines TMBDA, TMPDA and TMEDA. However, neither the tin salts nor the diamines show an ability to improve the cure of friability of the isocyanurate foams.

Unique among all of the combination catalyst is triethylene diamine. Triethylene diamine displayed an ability to improve both the cure and friability, as well as an ability to maximize the cream-to-gel, cream-to-rise and gel-to-rise ratios. The following data is indicative of the effect of triethylene diamine on cure.

TABLE X

|  | 1 | 2 | 3 | 4 |
|---|---|---|---|---|
| Part A | | | | |
| Mondur MR | 70 | 70 | 70 | 70 |
| Part B | | | | |
| Freon 11-B | 18 | 18 | 18 | 18 |
| DC-193 | 1 | 1 | 1 | 1 |
| D.O.P. | 5.95 | 5.9 | 5.7 | 5.5 |
| DMP-30 | 5.0 | 5.0 | 5.0 | 5.0 |
| DABCO | 0.05 | 0.1 | 0.3 | 0.5 |

TABLE XI
CUBES CUT FROM FREE RISE SAMPLES

| Cure Time (Hours) | 24 Hour Data in % Volume Change | | | | | | | | | | | |
|---|---|---|---|---|---|---|---|---|---|---|---|---|
| | Cold Shrink (−20° F) | | | | Dry Heat (300° F) | | | | Humid Aging (158° F, 100% R.H.) | | | |
| Foam | 1 | 2 | 3 | 4 | 1 | 2 | 3 | 4 | 1 | 2 | 3 | 4 |
| 6 | −20 | −10 | − 5 | − 5 | +20 | +10 | + 5 | + 5 | +30 | +30 | +20 | +20 |
| 12 | −10 | − 5 | − 5 | − 5 | +10 | + 5 | + 5 | + 5 | +20 | +20 | +15 | +15 |
| 24 | − 5 | − 5 | − 5 | − 5 | + 5 | + 5 | + 5 | + 5 | +10 | +10 | +10 | +10 |
| 48 | − 5 | − 5 | − 5 | − 5 | + 5 | + 5 | + 5 | + 5 | +10 | +10 | +10 | +10 |

Small quantities of triethylene diamine promote a more rapid cure than foams using aminoalkyl phenol catalysts alone. Cure enhancement also appears to maximize with increasing levels of triethylenediamine. After a certain point, increasing the amount of triethylenediamine has no further effect on the cure. Friability decreases with increasing concentration of triethylenediamine until a minimum of friability is attainned. Further, increases of cocatalyst show no effect. The cream-to-gel and gel-to-rise ratios maximize to 0.75, while the cream-to-rise ratio maximizes at 0.56. Interestingly, the reactivity of the foam, measured by gelation and rise, reaches a maximum (a minimum time) with increasing concentration of triethylenediamine, after which the reactivity decreases with further increases in triethylenediamine. The phenomena described above are unusual and unexpected, but equally surprising is the fact that the maximum rate of cure, maximum reactivity, and minimum of friability all occur at the same catalyst level. This level for a particular isocyanurate foam system employing an aminoalkyl phenol/triethylenediamine cocatalyst system is attained when the concentration of triethylenediamine is roughly 5 to 10% of the concentration of aminoalkyl phenol by weight percent or roughly 10 to 15% of the concentration of aminoalkyl phenol by mole percent.

Thus, I have found that small quantities of tri $C_2$-$C_3$ alkylene diamine like triethylenediamine in combination with aminoalkyl phenols as cocatalysts for the trimerization of isocyanates lead to polyisocyanurates, such as foams which are less friable, which have a heterocyclic ring structure, and which cure more rapidly than products catalyzed by aminoalkyl phenols alone or in combination with other amine or tin catalysts. Furthermore, small quantities of triethylenediamine can greatly enhance the reactivities of gelation and rise of the foam, while larger quantities can retard the reactivity. The maximum of reactivity and rate of cure and minimum of friability are usually attained when the concentration of diamine has reached 10 mole percent of the concentration of aminoalkyl phenol, and always by 15 mole percent, implying an upper limit to the amount of diamine that is useful. The lower limit of usefulness appears to be one mole percent. (For a Dabco-DMP-30 system, this corresponds to 0.5 to 8% range by weight percent). Aminoalkyl phenols alone or in combination with other catalysts do not show these effects. Finally, nonfriable isocyanurate trimer foams using this technique are produced without the use of polyol or polyester modifications or the like.

Although not wishing to be bound by any theory or explanation for the cocatalyst behavior set forth, and since an explanation or justification of why triethylene diamine should show this behavior is not known with certainty, one plausible explanation might be related to the use of the diamine as a free-radical trap; thus acting as a free-radical trap or inhibitor for the amino phenol.

My combination catalyst system is also useful with modified isocyanurate systems (such as polyol or polyester modifications) for further reduction of friability and promotion of cure. For such systems, the effect on reaction times is not as pronounced. Where the modification amounts to 40 to 50% of the total linkages, diluted, liquid forms of triethylenediamine in dipropylene glycol may be permissible.

Some typical formulations and properties of some varied foams follow.

TABLE XII

| FORMULATON I | | | |
|---|---|---|---|
| Part A | Wt. % | | |
| Mondur MR | 68.0 | Cream: | 22 sec |
| Part B | | Gel: | 43 sec |
| Freon 11-B | 17.0 | Rise: | 58 sec |
| D.O.P. | 8.9 | Density: | 1.63 pcf |
| DC-193 | 1.0 | | |
| DMP-30 | 5.0 | | |
| Dabco | 0.1 | | |

| Test | % Volume Change | |
|---|---|---|
| | 24 hrs. | 5 days |
| Dry Heat Aging (300° F) | 5.3 3.5% wt. loss | 7.1 7.2% wt. loss |
| Humid Aging (158° F, 100% R.H.) | 8.3 | 9.9 |

TABLE XIII

| FORMULATION II | | | |
|---|---|---|---|
| Part A | Wt. % | | |
| Mondur MR | 66.7 | Cream: | 21 |
| Part B | | Gel: | 59 |
| DC-193 | 3.0 | Rise: | 92 |
| R-11-B | 15.0 | Density: | 2.0 |
| DMP-30 | 5.0 | | |
| Dabco | 0.075 | | |
| D.O.P. | 10.2 | | |

| Test | % Volume Change | |
|---|---|---|
| | 24 hrs. | 5 days |
| Dry Heat Aging (300° F) | 4.7 | 5.2 |
| Humid Aging (158° F, 100% R.H.) | 7.7 | 9.6 |

TABLE XIV

| FORMULATION III | | | |
|---|---|---|---|
| Part A | Wt. % | | |
| Mondur MR | 65 | Cream: | 10 sec |
| Part B | | Gel: | 42 sec |
| Freon 11-B | 15 | Rise: | 60 sec |
| D.O.P. | 5 | Density: | 1.90 pcf |

TABLE XIV-continued

| FORMULATION III | | | |
|---|---|---|---|
| DC-193 | 3 | | |
| R-350-X | 7 | | |
| DMP-30 | 5 | | |
| Dabco | 0.2 | | |
| | % Volume Change | | |
| Test | 24 hrs. | 5 days | 7 days |
| Dry Heat Aging (300° F) | 12.8 | 13.0 | |
| | 4.4% wt. loss | 7.1% wt. loss | |
| Humid Aging (158° F, 100% R.H.) | 8.4 | 9.0 | 9.5 |

TABLE XV

| FORMULATION IV | | | |
|---|---|---|---|
| Part A | Wt. % | | |
| Mondur MR | 65 | Cream: | 22 sec |
| Part B | | Gel: | 35 sec |
| Freon 11-B | 15 | Rise: | 50 sec |
| D.O.P. | 7 | Density: | 1.95 pcf |
| DC-193 | 3 | | |
| DMP-30 | 5 | | |
| Dabco | 0.2 | | |
| | % Volume Change | | |
| Test | 24 hrs. | 5 days | 7 days |
| Dry Heat Aging (300° F) | 1.7 | 1.1 | |
| | 5.4% wt. loss | 9.1% wt. loss | |
| Humid Aging (158° F, 100% R.H.) | 6.2 | 9.3 | 12.4 |

TABLE XVI

| FORMULATION V | | | |
|---|---|---|---|
| Part A | Wt. % | | |
| Mondur MR | 65 | Cream: | 21 sec |
| Part B | | Gel: | 30 sec |
| DMP-30 | 3 | Rise: | 48 sec |
| DMP-10 | 3 | | |
| Dabco | 0.3 | | |
| Freon 11-B | 117.0 | | |
| DC-193 | 3.0 | | |
| D.O.P. | 8.7 | | |
| | % Vol Change | | |
| Test | 24 hrs. | 5 days | |
| Dry Heat Aging (300° F) | 4.7 | 5.3 | |
| | 3.2% Wt. loss | 4.3% wt. loss | |
| Humid Aging (158° F, 100% R.H.) | 8.8 | 9.1 | |

For the purposes of the formulations set forth herein, the following is an identification of the trademarks and tradenames of the products employed:

| Name | Material | Trademark of |
|---|---|---|
| 1. Freon 11-B | fluorotrichloromethane | E. I. duPont deNemours Co. |
| 2. MONDUR MR | crude polymeric isocyanate of polymethylene polyphenyl diisocyanate | Mobay Chemical Co. |
| 3. DC-193 | silicone-glycol copolymer | Dow Corning Co. |
| 4. DMP-10 | monodimethylaminomethyl phenol | Rohm & Haas Co. |
| 5. DMP-30 | tridimethylaminomethyl phenol | Rohm & Haas Co. |
| 6. Dabco | triethylenediamine | Air Products & Chemical Inc. |
| 7. TMBDA | tetramethylbutane diamine | |
| 8. T-12 | dibutyl tin dilaurate | |
| 9. NIAX A-1 | [(CH$_3$)$_2$NCH$_2$CH$_2$]$_2$O | Union Carbide Corp. |
| 10. DMEA | dimethylethanol amine | |

Similar results are obtained with the use of the ring like tripropylene diamine, while a reduction in friability and cure promotion in noncellular polyisocyanurate products may also be obtained with my cocatalyst system.

The polyisocyanurate foams produced by my cocatalyst system have handling characteristics similar in many cases to urethane foams, have densities as low as 1.5 pounds per cubic foot, often do not require additional flame-retardant additives, have good temperature and thermal resistance up to about 350° to 400° F, are typically closed-cell in nature and are suitable in solution purposes.

I claim:

1. In the process of preparing a polyisocyanurate product, which process comprises reacting a polyisocyanate in the presence of a catalytic amount of a trimerization catalyst to provide a polyisocyanurate, the improvement which comprises:

carrying out the reaction in the presence of a trimer cocatalyst system which comprises from about 1 to 15 percent by weight of the product of a dialkylaminoalkyl phenol trimerization catalyst, and from about 1 to 15 weight percent of the dialkylaminoalkyl phenol of a tri $C_2$–$C_3$ alkylene diamine to provide a polyisocyanurate of immproved friability properties.

2. The process of claim 1 wherein the polyisocyanate is a diisocyanate, and the polyisocyanurate consists essentially of isocyanurate linkages.

3. The process of claim 1 wherein the dialkylaminoalkyl phenol is a dimethylaminomethyl phenol.

4. The process of claim 1 wherein the diamine is triethylene diamine.

5. The process of claim 4 wherein the diamine is present in an amount of from about 10 to 15 weight percent of the phenol.

6. The process of claim 1 wherein the reaction is carried out in the presence of an inert liquid volatile blowing agent to provide a polyisocyanate foam product of improved friability properties.

7. The process of claim 1 wherein the blowing agent is a fluorine-containing lower alkene.

8. The process of claim 1 wherein the amount of the dialkylaminoalkyl phenol comprises from about 5 to 15 percent by weight.

9. The process of claim 1 wherein the reaction is carried out without the use of external heating, and the polyisocyanurate is formed by the exothermic heat of the reaction.

10. The process of claim 1 wherein the polyisocyanate is an isocyanate-terminated urethane prepolymer.

11. The polyisocyanurate product produced by the process of claim 1.

12. The polyisocyanurate trimer foam product produced by the process of claim 6.

13. The polyisocyanurate trimer foam product produced by the process of claim 7 wherein the foam product consists essentially of trimer isocyanurate linkages.

14. The process of preparing a polyisocyanurate trimer foam consisting essentially of recurring isocyanurate linkages and of good friability properties, which process comprises:

reacting a diisocyanate in the presence of a catalytic amount of from about 1 to 15 percent by weight of the polyisocyanurate of a dimethylaminomethyl phenol trimerization catalyst, and in the presence of from about 1 to 15 weight percent, based on the dimethylaminomethyl phenol catalyst, of a triethylene diamine cocatalyst, and in the presence of from about 1 to 40 percent by weight of an inert liquid halocarbon blowing agent, the reaction carried out by the exothermic heat of the reaction to provide a polyisocyanurate foam of good friability properties.

15. The polyisocyanurate foam product produced by the process of claim 14.

16. A trimerization cocatalyst composition which, on mixing with a polyisocyanate compound subject to trimerization to a polyisocyanurate, provides for the room temperature reaction to produce an improved polyisocyanurate trimer foam, which composition comprises:

a. a trimer cocatalyst system which, after mixing with the polyisocyanate, comprises from about 1 to 15 percent by weight of the polyisocyanurate foam of a dialkylaminoalkyl phenol trimer catalyst, and from about 1 to 15 weight percent of the dialkylaminoalkyl phenol of a tri $C_2$–$C_3$ alkylene diamine;

b. an inert blowing agent in an amount sufficient to expand the reactive components on mixing by the reaction exotherm to a foam of desired density; and c. a cell-control agent to aid in the formation of the desired foam cell size.

17. The composition of claim 16 wherein the dialkylaminoalkyl phenol is a dimethylaminomethyl phenol.

18. The composition of claim 16 wherein the diamine is triethylene diamine.

19. The process of claim 1 wherein the polyisocyanate is a polymethylene polyphenodiisocyanate.

20. The composition of claim 16 wherein the cell-control agent is a silicone-glycol copolymer.

* * * * *